SPATIAL MAN-MACHINE COMMUNICATIONS SYSTEM

Filed June 24, 1968 2 Sheets-Sheet 1

INVENTOR
JOHANN W. SATTLEGGER
Harold E. Meier
ATTORNEY

SPATIAL MAN-MACHINE COMMUNICATIONS SYSTEM

Filed June 24, 1968 2 Sheets-Sheet 2

INVENTOR
JOHANN W. SATTLEGGER

Harold E. Meier

ATTORNEY

United States Patent Office 3,539,981
Patented Nov. 10, 1970

3,539,981
SPATIAL MAN-MACHINE COMMUNICATIONS SYSTEM

Johann W. Sattlegger, Dallas, Tex., assignor to Texas Instruments Incorporated, Dallas, Tex., a corporation of Delaware Filed June 24, 1968, Ser. No. 739,408
Int. Cl. G01v 1/00
U.S. Cl. 340—15.5 15 Claims

ABSTRACT OF THE DISCLOSURE

Apparatus for three-dimension display including a stereoscopic viewing system and a pair of cathode ray tubes. Data representing an object to be displayed in three-dimensional form by the stereoscopic system is stored in a memory array. This stored data consists of the three-dimensional coordinates of every point required to define the object and its relationship to surrounding points. Each of the cathode ray tubes displays in two dimensions an image made up of points selected from the memory array. The images displayed on the cathode ray tubes have a space relationship such that, when simultaneously viewed through the stereoscopic system, a three-dimensional image appears. A control module selects the stored points to be displayed on the cathode ray tubes, thereby orienting the three-dimensional image. The stereoscopic display may also be rotated around one of the three coordinate axes and reduced or enlarged in scale from the control module.

Figure 1:
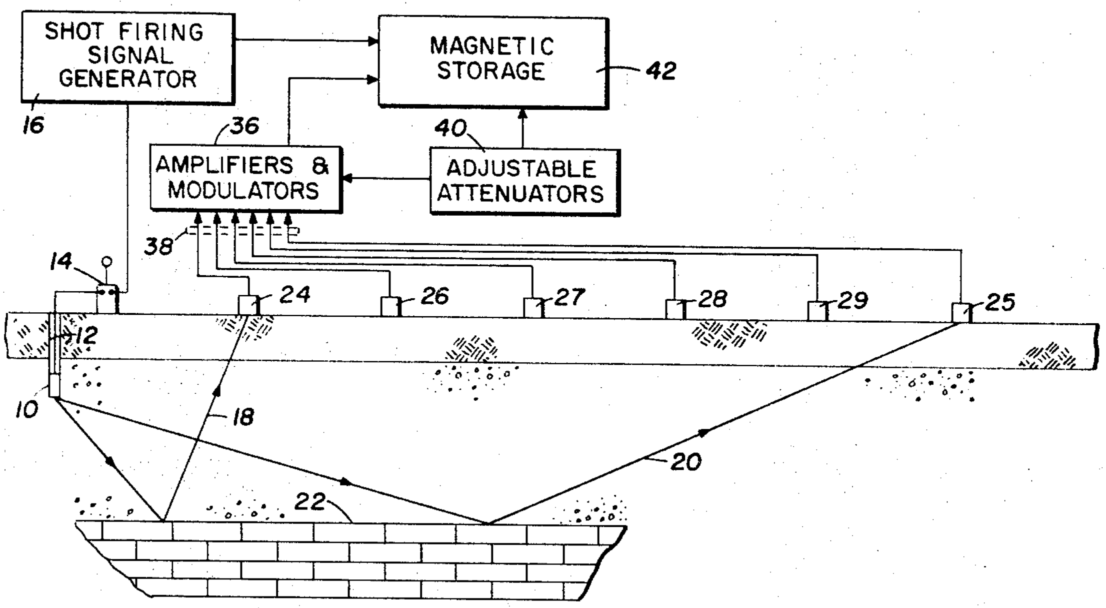

This invention relates to a spatial man-machine communications system, and more particularly to a three-dimensional display controllable by means of a man-machine communication link.

It has long been recognized that two-dimensional displays often prevent an observer from fully understanding the nature of the object he is viewing. Only those properties of an object related to opacity or reflectance and color are discernible when viewing a two-dimensional display. In many applications, it is highly desirable to know what exists along a third coordinate axis. This third coordinate axis can, for example, be related to space or time.

Heretofore, three-dimensional displays have been produced by stereoscopic viewing systems whereby an observer viewed two displays in two dimensions related in some manner along the third coordinate axis. Where the third coordinate axis was distance, the two-dimensional displays are space-related; that is, they are two-dimensional displays of a given object viewed from different angles.

Advantage is frequently taken of the display capabilities of a cathode ray tube to produce the two-dimensional displays. The cathode ray tube is ideally suited to produce a two-dimensional display of a continuously changing nature to emphasize the time variable along the third coordinate axis. Previously, however, three-dimensional display systems employing cathode ray tubes were limited to displaying an object fixed in space or moving along a predetermined path.

In accordance with the present invention, there is provided a three-dimensional viewing system employing a man-machine communication link to orient the image of an object such that an observer may view the most desirable position with emphasis on more important areas. To provide this preferred axis display, a memory array is programmed with the three-dimensional coordinates of the required number of information points to adequately display an object from any selected direction. In addition, information is also stored in the memory array to correctly associated adjacent points with each other. A set of control push buttons connects to the memory array to select the object identification points to be displayed on a pair of cathode ray tubes. The points selected are such as to produce two-dimensional displays on the cathode ray tubes which when combined by a stereoscopic viewing system produce a three-dimensional view along a preferred axis. The cathode ray tubes are controlled from buffer memories which are programmed with two-dimensional information from the memory array.

In view of the need for more easily understood displays, it is an object of this invention to provide a three-dimensional man-machine communications system. Another object of this invention is to provide a spatial man-machine communications system for displaying an object along preferred axes of orientation. A further object of this invention is to provide a spatial man-machine communication system wherein an observer controls the enlargement of certain pre-selected areas of an object for display. An additional object of this invention is to provide a spatial man-machine communications system wherein an observer controls the emphasis of certain desired features of a model. Other objects and advantages will be apparent from the specifications and claims and from the accompanying drawings illustrative of the invention.

Figure 3:
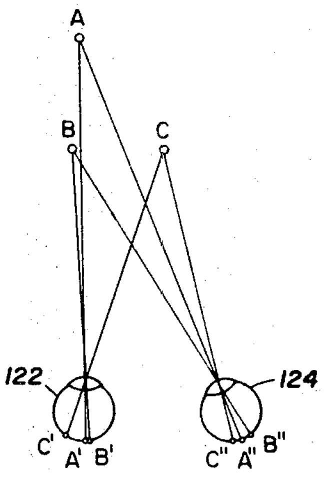
Figure 4:
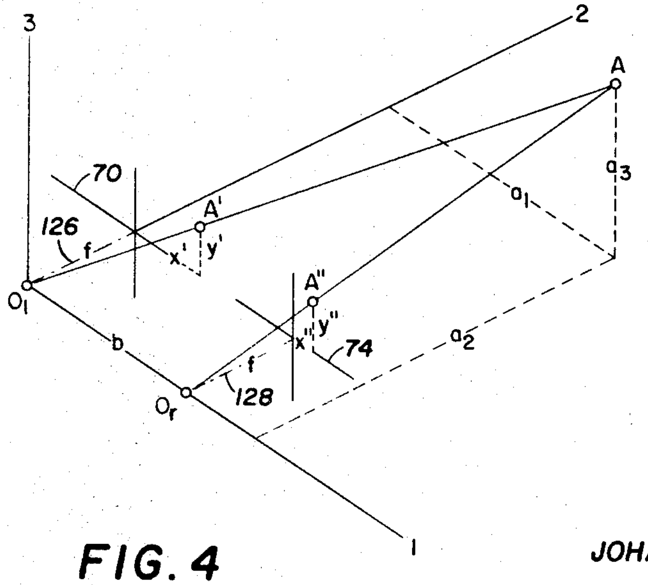
Figure 2:
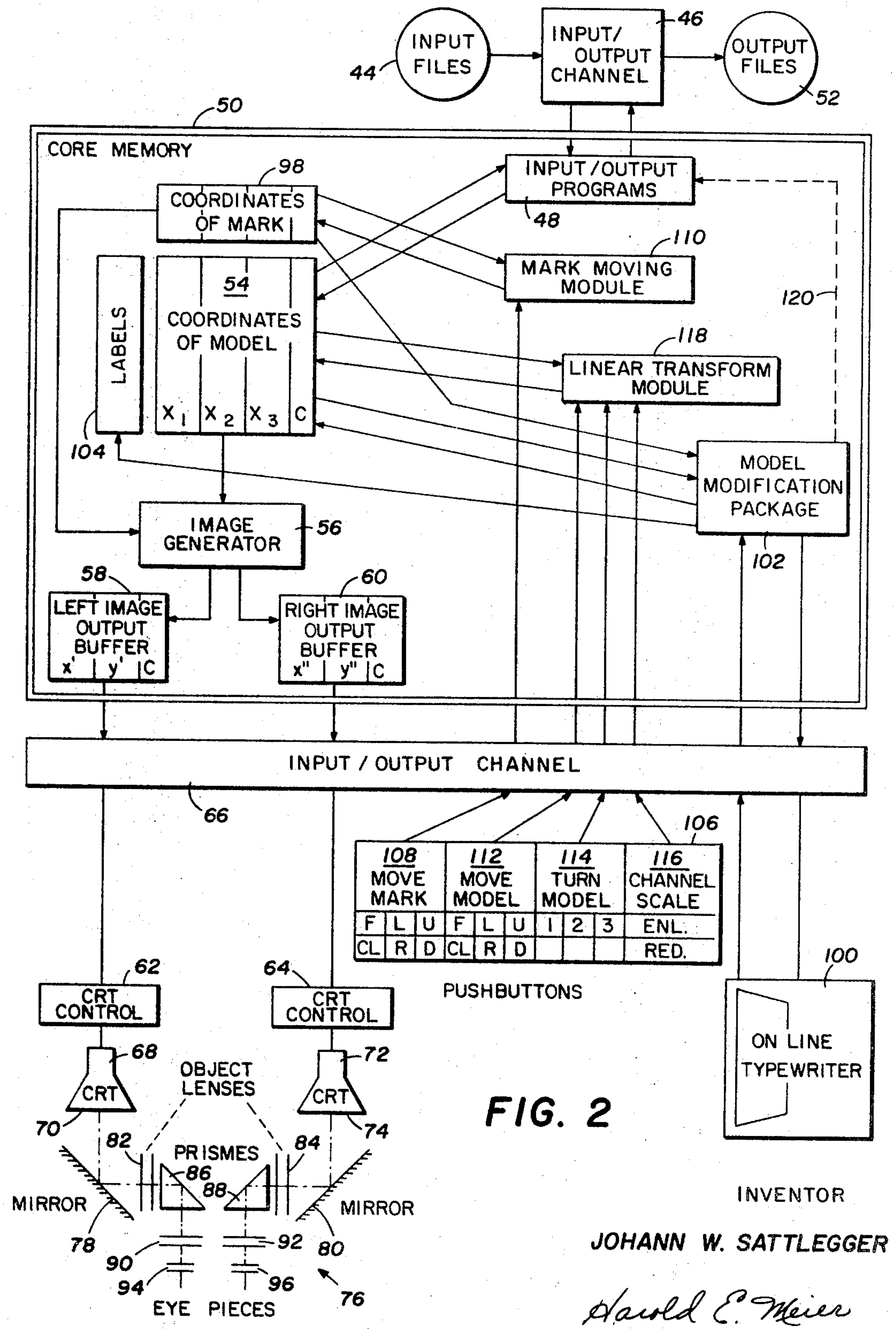

Referring to the drawings:

FIG. 1 schematically illustrates a seismic data-gathering system for collecting sub-surface information to be displayed on the three-dimensional system of this invention, FIG. 2 is a block diagram of a spatial man-machine communications system in accordance with this invention for presenting the sub-surface data gathered by the system of FIG. 1 in three-dimensional form, FIG. 3 illustrates the geometric relationship pertaining to depth perception, and FIG. 4 is a line diagram showing a projection system for three-coordinate perception.

Although not necessarily limited thereto, the display system of this invention will create a three-dimensional display from information representing sub-surface strata and will thus be described with reference to seismic exploration. Seismic explorations are carried out primarily for the purpose of locating and determining the nature of sub-surface structures. The methods employed to obtain information concerning geological structures are many and well understood. Unfortunately, hitherto the seismic data obtained from geophysical exploration had to be interpreted from two-dimensional displays. Such displays failed to give insight into all the important features of sub-surface information.

Referring to FIG. 1, there is shown, greatly simplified, a geophysical exploration system wherein a charge of dynamite 10, detonated in a bore 12 by actuation of a blaster 14 with a signal from a shot-firing signal-generator 16, initiates seismic waves which travel in all directions from the source. The ray paths 18 and 20 represent the primary reflections from a sub-surface reflector 22 to seismic detectors 24 and 25, respectively. The ray paths 18 and 20 are an over-simplification of the actual wave pattern that exists. Seismic information is also collected by the detectors 26 through 29 from the sub-surface reflector 22 and from other sub-surface reflectors found deeper below the earth's crust. Since the problem is to locate and to find sub-surface reflectors over wide areas of the earth's surface, an array consisting of many detectors is formed about the bore hole 12. All the seismic detectors, or geophones, in an array produce sufficient seismic data to adequately define the sub-surface construction over a given area and for a considerable depth. If properly displayed this information will give insight into the sub-surface structure in three coordinate directions from any selected point of view.

The wave information gathered by the detectors 24 through 29 will be transmitted to a set of conventional amplifiers and modulators 36 through an insulated cable 38. Adjustable attenuators connected to the amplifiers and modulators 36 may be adjusted so as to optimize the signal strength of the seismic data before being stored in a magnetic storage unit 42. Also stored in a magnetic unit 42 is information concerning the setting of the attenuators 40 and the firing time of the dynamite charge 10.

The magnetic storage unit 42 now contains sufficient information to study the sub-surface structure in the area covered by the seismic detector array. Referring to FIG. 2, there is shown a display system in accordance with this invention wherein seismic information may be displayed in three-dimensional form from any desired viewing angle. The seismic data from the magnetic unit 42 is transferred to an input file 44 which connects to an input/output channel 46. The input/output channel 46 reads the input file 44 and transmits the information therein to an input/output programming unit 48. Typically, the input/output program unit 48 and all components within the outline 50 are part of a digital computer core memory having the capacity to carry out the functions of the various components. In accordance with conventional digital computer operation, information can also be transferred from the core memory 50 through the input/output channel 46 to an output file 52. Each information bit received by the program unit 48 is catalogued as to its point of origin, assigned coordinates along three directions, $X_1$, $X_2$, and $X_3$, and stored in a memory array 54. Information relating each point to surrounding points is stored in channel C of the memory array 54. When completely programmed, the memory array 54 contains all the seismic information collected by the system of FIG. 1, catalogued as to its point of origin by three coordinate directions.

An image generator 56 takes selected points from the memory array 54 and generates image codes to a left-image output buffer 58 and to a right-image output buffer 60. The output buffers 58 and 60 have an array capacity of $3 \times N_1$ each, where $N_1$ is less than the number of points actually displayed. Each row of the output buffers accommodates the two coordinates (in the screen coordinate system) of a point. In addition, for each point a code is stored in column C that relates a particular point to its surrounding points.

To generate a three-dimensional display, the programs stored in the output buffers 58 and 60 are transmitted to respective CRT controls 62 and 64 through an input/output channel 66. The CRT controls 62 and 64 generate analog voltages from the transferred digital programs to control the electron gun of a cathode ray tube. The CRT control 62 energizes the electron gun of a cathode ray tube 68 to graphically display on a viewing screen 70 a two-dimensional image of the points selected from the memory array 54. Similarly, the CRT control 64 operates the electron gun of a cathode ray tube 72 to present a graphical display in two dimensions on a viewing screen 74 another set of selected points from the memory array 54.

A stereoscopic viewing device 76, through which the screens 70 and 74 are seen by an observer, comprises any suitable arrangement of lenses or mirrors for bringing the images respectively in line with the observer's eyes. The three-dimensional character of this presentation will be readily apparent to the observer and does not require any mental interpretation to introduce the element of depth to the display. The combined stereoscopic images presented to the observer is in three dimensions due to the fact that the two constituent images on the viewing screens 70 and 74 have, in effect, slightly different orientations. As shown in FIG. 2, the stereoscopic display system 76 includes mirrors 78 and 80 for reflecting the two-dimensional images from the screens 70 and 74, respectively, through object lenses 82 and 84. Prisms 86 and 88 direct the images from the screens 70 and 74 through lenses 90 and 92 and eye pieces 94 and 96.

In order to make changes in the three-dimensional display viewed through the stereoscopic device 76, a three-dimensional spatial mark is displayed along with the model. The coordinates of this mark are stored in a mark array 98 and programmed for a desired display orientation into the output buffers 58 and 60 through the image generator 56. This mark can be moved in three coordinate directions and thus brought to any portion of the model in space where a change is desired. The desired change is effected by updating the memory array 54 by means of an on-line typewriter 100 coupled through the input/output channel 66 to a model modification module 102. The modification module 102 in turn connects to the memory array 54. Changes made by the typewriter 100 through the modification module 102 updates the information in the memory array 54 at the location of the spatial mark as it appears in the three-dimensional display.

Another feature of the display system shown in FIG. 2 is the ability to label portions of the display model e.g., to assign an identification number to a seismic interface for further processing. This operation will also be performed by the on-line typewriter 100 by a connection from the modification module 102 to a label array 104. The label array 104 is in fact a part of the memory array 54, and the label information stored therein is programmed into the output buffers 58 and 60 along with the model information through the image generator 56. To locate a label on the model, the spatial mark is simply moved to that portion of the model to be labeled. The label becomes a part of the file representing the model and is available for further applications.

To move the model and the spatial mark in three coordinate directions, turn it around either one of three coordinate axes, and reduce or enlarge it in scale; a control console 106, having 18 push buttons, connects to the core memory 50 through the input/output channel 66. Push buttons one through six of section 108, move the spatial mark further (F) or closer (CL) to the observer, to the left (L), to the right (R), up (U), or down (D). So long as one of the six push buttons is activated, a mark-moving module 110, connected to the section 108 through the input/output channel 66, continually updates the coded information in the mark array 98 to move the mark in small increments at short time intervals in a desired direction.

Push button sections 112, 114, and 116 provide instructions to a model linear transform module 118 connected to the push button sections through the input/output channel 66. The transform module 118 also connects to the memory array 54. The six push buttons of the section 112 move the model further or closer to the viewer, to the left or right on the viewing screens 70 and 74 and up or down. In section 114, six push buttons are provided to rotate the three-dimensional display about any one of the three coordinate axes. To change the scale of the display, the push button section 116 includes a scale-increasing button and a scale-decreasing button. Operation of the various push buttons in the sections 112, 114 and 116 serve to select the points stored in the memory array 54 to be programmed into the output buffers 58 and 60. Thus, the control console 106 provides a man-machine communication link which enables an observer of the three-dimensional display to continuously vary the outline and orientation of the patterns on the viewing screens 70 and 74.

One additional operation of the on-line typewriter 100 enables the introduction of a completely new model into the memory array 54. This is accomplished by means of the modification module 102 and a connection 120 to the input/output program unit 48. As an example, the model stored in the memory array 54 may consist of a system of seismic sections, one or all of which an observer may desire to replace.

In operation, a model in the form of a set of three-dimensional coordinates is stored in the memory array 54 of the computer 50. Two different pictures of the model are generated from three-dimensional coordinates, one for the left eye and one for the right, which, considered with an appropriate optical system, merge to form one spatial picture. To understand the operation of the stereoscopic device 76, consider the principles of the stereoscopic vision and its relationship to the creation of the illusion of depth. Referring to FIG. 3, the distance between projections of points A and B on the retina of the left eye 122, indicated at A′ and B′, is different from the distance between these two projections on the retina of the right eye 124, as indicated at A″ and B″. This difference in distance on the retina will be interpreted by the brain to be a difference in space, namely in distance. Thus, the perception of depth is a subjective phenomena that results from the fusion of the independent images provided to the brain by each of the eyes. Consider next images at points B and C in the same plane; the difference between the projections on the retina of the eye 122 (C′, B′) are now equal to the distance between the projections on the eye 124 (C″, B″). Hence, these two points are seen at different locations but at equal distances.

To percieve depth, the "eyes+brain" system must be presented two projections of a model as viewed from two different locations. To meet this requirement, the image generator 56 produces a different image for the output buffer 58 than for the output buffer 60. These images are employed to generate two displays in two dimensions at two projection locations. The separation between the two projection locations may correspond to interocular distance of the observer's eyes or may be greater to exaggerate the illusion of depth.

The viewing angle of the model displayed on the viewing screens 70 and 74 is controlled by the program of the image generator 56. To understand how this program functions, consider the projection system of FIG. 4 for a point model A in a 1–2–3 coordinate system. Viewing screens 70 and 74, of the two high resolution cathode ray tubes 68 and 72, are shown in a so-called "diapositive position," i.e., with the centers of projection behind them with respect to the point model A. It is assumed that the two viewing screens 70 and 74 are in one common plane and that their axes of projection are, therefore, parallel. The origin of the screen coordinate system, $x'y'$ for the screen 70, and $x''y''$ for the screen 74, are at points perpendicular to center projections 126 and 128, respectively, which are equal to the focal length, $f$, of the system. The focal length for both the viewing screens 70 and 74 is the same.

Consider the point model A located at coordinates $a_1$, $a_2$, and $a_3$, which are programmed into columns $X_1$, $X_2$, and $X_3$, respectively, of the memory array 54. The point model A produces two images A′ and A″ on the viewing screens 70 and 74, respectively. To produce a three-dimensional model, these images must be located on the viewing screens 70 and 74 on straight-line projections from the point model A to the focal points $0_l$ and $0_r$. Image A′ has coordinates $x'$, $y'$), and the image A″ has coordinates ($x''$, $y''$) in their respective screen coordinate systems. The image program generator 56 generates the coordinates for image A′ and image A″ in accordance with the following equations:

$$(x',y')=f/a_2(a_1,a_3),$$

$$(x'',y'')=f/a_2(a_1-b,a_3)$$

where $b$ is the distance between the focal points $0_l$ and $0_r$, defined as the system base. Subscripts 1, 2, and 3 define a right-hand coordinate system with the origin coinciding with the left focal point $0_l$, the 1-axis coinciding with the base $b$, the 2-axis coinciding with the center-line axis of the viewing screen 70, and the 3-axis in a vertical direction.

To generate a complicated three-dimensional model, the image generator 56 calculates the coordinates ($x'$, $y'$) and ($x''$, $y''$), for each point selected from the memory array 54. For generating a transparent model, the image generator 56 calculates the coordinates of all the points and their relationship to surrounding points in the desired viewing area along the depth or time axis. However, where only surfaces visible from a selected viewing position are to be displayed, the image generator 56 would, in addition to calculating the coordinates of each point to be displayed, also determine what points stored in the memory array 54 are visible from the selected viewing position. This could be accomplished by any one of a number of different techniques. For simple models, all the points lying in the plane passing through at the viewing position, such as the focal point $0_l$ of FIG. 4, would be investigated simultaneously to determine their visibility. The points in this plane nearest the viewing position would be transferred to the respective output buffer 58 or 60 and all points behind the first visible points would be rejected by the image generator 56. For a more complicated model, each point would be analyzed individually to determine if a plane exists between its position in the model and the viewing position. Recalling that there are two viewing positions, such as focal points $0_l$ and $0_r$ of FIG. 4, each point in a model would have to be analyzed from two different directions. To simplify the point selection procedure for a complicated model, the model could be approximated by an arrangement of interconnected small areas (facets). With such a simplification, the point of intersection of two lines defining one corner of such area would be analyzed as to its visibility. If the line of sight projection from the viewing position was interrupted by another facet before reaching a given point, the point would not be visible. Thus, only those points which are on a line of sight projection from a viewing position without interruption would be transferred to the output buffers after calculation of the appropriate coordinates. The sum total of all selected points are displayed in two dimensions on the cathode ray tubes 68 and 72. The stereoscopic system 76 permits an observer to view the two displays in two directions simultaneously, and he sees a three-dimensional model.

Although the basic principles of the invention have been described with relation to a system for displaying seismic data in three-dimensional form, it is not intended that the invention be so limited. Also, modifications in the hardware shown in FIG. 2 are possible, such as displaying both two-dimensional images on a single cathode ray tube. Thus, while only one embodiment of the invention, together with modifications thereof, has been described in detail herein and shown in the accompanying drawings, it will be evident that various further modifications are possible in the arrangement and construction of its components without departing from the scope of the invention.

What is claimed is:

1. A spatial man-machine communication system comprising:

means for storing three-dimensional coordinates of a plurality of object identification points, means for generating a first two-dimensional display from selected points transferred from said storage means, means for generating a second two-dimensional display from a second selection of points transferred from said storage means, means for viewing both of said two-dimensional displays simultaneously and thereby producing a three-dimensional image, and means for selecting the stored object identification points for both of said two-dimensional displays to produce a three-dimensional object image along preferred axes.

2. A spatial man-machine communication system as set forth in claim 1 including scale-changing means to select object identification points from said storage means to enlarge both two-dimensional displays of a desired object area.

3. A spatial man-machine communication system as set forth in claim 1 including means for displaying a spatial mark on said two-dimensional displays.

4. A spatial man-machine communication system as set forth in claim 1 including means coupled to said storage means for modifying the three-dimensional coordinates of the object identification points.

5. A spatial man-machine communication system as set forth in claim 1 including means for programming said storage means with object identification points.

6. A spatial man-machine communication system comprising:

means for storing the three-dimensional coordinates of a plurality of object identification points, an input/output programmer for generating the three-dimensional object identification points to said storage means, means for generating a first two-dimensional display from selected points transferred from said storage means, means for generating a second two-dimensional display from a second selection of points transferred from said storage means, means for viewing both of said two-dimensional displays simultaneously to produce a three-dimensional image, means for programming said first and second generating means with selected object identification points transferred from said storage to produce a three-dimensional display of an object along preferred axes, and control means to orient the three-dimensional display in three coordinate directions, rotate said display around one of the three coordinate axes, and modify the scale of said dasplay.

7. A spatial man-machine communication system as set forth in claim 6 wherein said first and second two-dimensional display generating means includes a cathode ray tube.

8. A spatial man-machine communication system as set forth in claim 7 wherein said viewing means includes a stereoscopic display.

9. A spatial man-machine communication system as set forth in claim 8 including means for modifying the three-dimensional coordinates of the object identification points in said storage means.

10. A spatial man-machine communication system for displaying seismic data comprising:

means for generating seismic data reflected from subsurface formations at a plurality of seismometers, means for correlating said data into a plurality of three-dimensional sub-surface identification points, means for storing the three-dimensional coordinates of a plurality of said sub-surface identification points, means for generating a first two-dimensional display of a selected sub-surface area with points transferred from said storage means, means for generating a second two-dimensional display of a second sub-surface area related to said first area with points transferred from said storage means, and means for viewing both of said two-dimensional displays simultaneously to produce a three-dimensional image of a selected sub-surface area.

11. A spatial man-machine communication system for displaying seismic data as set forth in claim 10 including control means to select the stored sub-surface identification points to be transferred to said first and second generating means to orient the image in three coordinate directions.

12. A spatial man-machine communication system for displaying seismic data as set forth in claim 11 wherein said control means includes means for rotating said three-dimensional image around one of the three coordinate axes and modifying the display scaling.

13. A spatial man-machine communication system for displaying seismic data as set forth in claim 10 including means for modifying the sub-surface data stored in said storage means.

14. A spatial man-machine communication system for displaying seismic data as set forth in claim 13 wherein said first and second display generating means each include a cathode ray tube coupled to individual two-dimensional storage memories.

15. A spatial man-machine communication system for displaying seismic data as set forth in claim 14 including means for programming said first and second two-dimensional storage memories from the sub-surface points in said storage means.

References Cited

FOREIGN PATENTS 726,307 1/1966 Canada.

RODNEY D. BENNETT, Jr., Primary Examiner

J. G. BAXTER, Assistant Examiner